Nov. 25, 1941.         H. TRETTER         2,264,102
IMPLEMENT FOR ADJUSTING THE TEMPERATURES OF LIQUIDS
Filed July 22, 1939
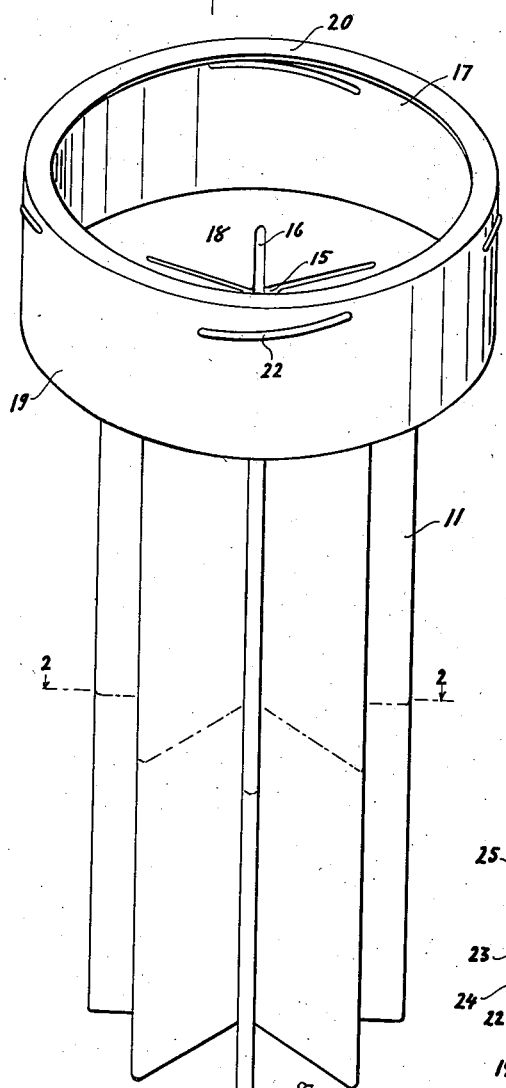
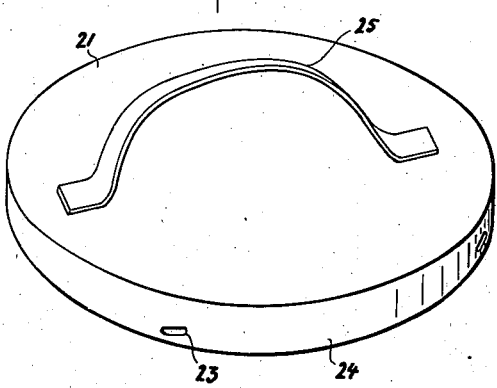
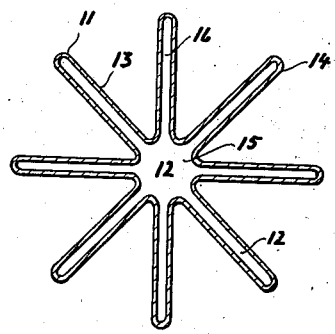
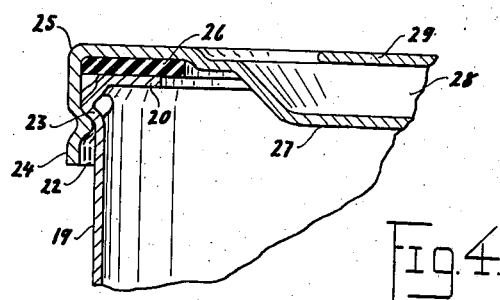
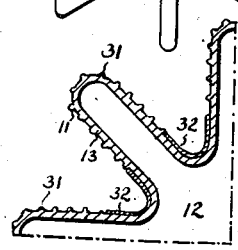
INVENTOR
*Hans Tretter*
BY
ATTORNEY Patented Nov. 25, 1941

2,264,102

UNITED STATES PATENT OFFICE 2,264,102

IMPLEMENT FOR ADJUSTING THE TEMPERATURES OF LIQUIDS

Hans Tretter, Trenton, N. J.

Application July 22, 1939, Serial No. 286,040

1 Claim. (Cl. 257—254)

These improvements concern an implement for adjusting temperatures of liquids, i. e. a portable device, which may be applied at random to a liquid for raising its temperature or for lowering the temperature thereof.

The heating art is replete with and has achieved high efficiency concerning arrangements for heat-conditioning liquids. But ordinarily this involves a complex installation of heating means in connection with a tank accommodating the liquid or a container with liquid has to be brought to the heat transfer means for conditioning, e. g. to a stove or an ice box. Where the temperature was to be raised by bringing the heating means to the liquid, the art generally limited itself to more complex prime heaters, e. g. electrically heated units suited for immersion. But where the temperature is to be raised or lowered by immersion of submersion of the heat-transfer elements, the bulk or volumetric displacement of such elements had to be allowed for, i. e. the liquid to be conditioned could occupy, at most, part only of its container.

This disadvantage of the prior art is overcome in the instant invention, and more particularly the change of the level of a liquid by reason of immersion of a heat control implement is to be reduced to a minimum.

It is another object of this invention to execute an implement serving for heat control in the most simple fashion, preferably by providing that it may receive, suitably retain and circularize a heat transfer medium although it is specifically contemplated that heat adjustment in the implement may also be effected by way of primary heat control, such as chemical reactions caused therein.

The utility of an implement of the kind discussed is to be further enhanced by providing adaptability to promiscuous uses, be that in every day life the conditioning of the temperature of a beverage or the water in an aquarium, or in an industry or a laboratory any kind of a solution such as a bath used in photography.

As a matter of fact the field of photography offers by itself a variety of uses, which may, exemplarily, here be relied upon for explanation, because in the development of negatives or positives the photographer may use wide and shallow dishes equally well as deep but possibly narrow tanks.

Additional objects of this invention,—such as provision for careful segregation of the transfer medium from the liquid to be conditioned, will be brought forth in the following description of a specific embodiment of the invention, which is however given for purposes of illustration only, and not in limitation of the scope of this invention.

In the drawing:

Fig. 1 is a perspective side view of a container of an embodiment of this invention.

Fig. 2 is a corresponding cross-sectioned top view, the section being taken at a level which is pointed out in Fig. 1 by dot-dash lines, an arrow and the numeral 2.

Fig. 3 shows, in a view corresponding to that of Fig. 1, a cover which may be applied to the container of Fig. 1.

Fig. 4 illustrates, by way of a cross-sectioned detail view, a modified arrangement of the upper end of the container and the cover applied thereto.

Fig. 5 is a part view, which otherwise corresponds to that of Fig. 2, of a preferred embodiment.

Similar numerals refer to similar parts throughout the various views.

When delicate heat adjustments are to be effected in a liquid, it may not be advisable to apply the heat transfer medium at too great a difference of temperature in relation to the temperature of the liquid to be treated. Since it is desirable, to provide the heat transfer medium in a substantial bulk in order not to limit the control to a merely momentary heat exchange, if the degree of heat of the heat transfer medium differs in such a case comparatively little from the temperature of the liquid to be conditioned, the instant invention provides for communicating vessels or portions of a container, one of which is primarily shaped for the accommodation of a supply of the heat transfer medium whereas the other section serves primarily for heat transfer. However, if conditions do not necessitate the provision of a larger supply of the heat transfer medium in connection with an implement of this invention, the said implement may well be limited to the last mentioned portion. Such a heat transfer vessel or portion is for instance illustrated in the lower vessel or part of the embodiment of Fig. 1, and the cross-section of Fig. 2, as bottomwise closed vessel 11 with reentering walls 13. The bottom 12 of such part 11 is flat, or should preferably be executed in such fashion that the implement may stand upright upon the bottom of a vessel containing the liquid to be conditioned. Furthermore the reentering walls 13 are preferably vertically or steeply helically disposed, if a splashing of the liquid to be conditioned is to be avoided when the heat control implement is immersed. The walls 13 are shown in the drawing to define web- or rib-like compartment 16, and may, for example, accommodate the heat transfer medium in comparatively thin, vertical strata which merge radially with a central compartment 15. Making due allowance for convection of the liquid to be conditioned in contact with the vessel or part 11, for structural questions of assembly of the bottom and reentrant walls, as well as for approachability of the surfaces of the vessel 11, e. g. for purpose of cleaning, the arrangement of the plurality of compartments communicating in a vessel or part 11 is of course subject to multifarious modification in design.

With the heat transfer vessel or part 11 a vessel may be connected which contains a suitable supply of the heat transfer medium. For such purpose Fig. 1 shows an upper vessel or part 17 having a bottom 18, from which arises a cylindrical wall 19. The upper end of the cylindrical wall 19 is shown to be broadened out into a rim 20, which facilitates closing abutment of a cover 21 (Fig. 3) to be applied to the top of supply vessel 17. As a means for the engagement of cover 21 upon the vessel 17 the drawing indicates bayonet lock means, i. e the cooperatingly arranged spiral grooves 22 on the cylindrical wall 19 and indentations 23 on the rim 24 of cover 21. Handle 25 facilitates assembly and separation of cover and container, and is at the same time useful for handling the implement as a whole when it is to be transported and to be immersed in or withdrawn from the liquid to be conditioned.

In the embodiment of the drawing the central compartment 15 as well as the radial compartment 16 are all shown to communicate fully at their upper end with the upper part or vessel 17.

The heat transfer vessel or part 11 is preferably executed in a heat-conductive material, such as metal, which should however also be chosen to avoid any undesirable reaction with the heat transfer medium and with the liquid to be conditioned. If the upper part or vessel 17 is executed in the material of the lower part 11, it may be suitably insulated, for instance by a protective coating. This also applies to the cover 21.

For purposes of a good closure the cover may contain a gasket, e. g. a rubber washer of the type indicated at 26 in connection with the modification of Fig. 4.

If the embodiment is to be applied for lowering the temperature of a liquid to be conditioned, for instance for cooling a photographic developing liquid in a tray in the summer time, the upper part 17 may be filled with ice or with a cold slush, so that the ice water descends into and fills the vessel or part 11. If the container is then closed by the cover 21 and immersed in the liquid to be conditioned, it may remain standing by way of its bottom 12 upon the bottom of the container of the liquid to be conditioned until the latter liquid has been reduced to the desired temperature.

As an exchange of heat takes place by way of the walls of the vessel or part 11, between the ice water contained in the vessel or part 11 and the liquid to be conditioned, the heat transfer medium or water thus effected will become warm, so that convection takes place and the portions of the heat transfer medium, which had previously been accommodated at the lower end of the vessel or part 11, will be replaced by heavier and colder upward portions of the heat transfer medium contained further up in part 11 and in the part 17 of the implement.

The walls 13 may be corrugated or otherwise irregularly outlined near the outer end of the fins, as indicated at 31 in Fig. 5, in order to increase the heat transfer surface. Near the center, however, paint 32 or other means of insulation may be applied in order to limit heat diffusion of the central column, and thus better to define the path of circulation, in which the cold water descends in the central column or compartment 15 and the hot water arises in the fins.

An embodiment of the invention involving the parts indicated in Fig. 4 may be generally similar to the embodiment of Fig. 1, except that the cover 25 is here shown to be centrally depressed at 27, in order to provide recess 28 allowing for manipulation of the handle 29, which handle bridges said recess 28 substantially in level with said top of cover 25.

By this or by other arrangements known to those versed in the art, the implement may be arranged in such fashion that it may be stood upside down. Such positioning may be resorted to when an implement of this invention is to be held in readiness for heating a liquid to be conditioned and when such heating is to be brought about by the elevated temperature of the heat transfer medium in the implement. In such an upside down position of the implement the hottest portion of the heat transfer medium will collect, upon standing, near the bottom 12 of the implement, so that the device will provide the greatest heating effect at that point when it is eventually reversed and immersed in the liquid to be conditioned.

Generally speaking it may be said that—in an embodiment like that of Fig. 1 comprising a heat transfer vessel and a supply vessel for the heat transfer medium—the vessel or part 11 should combine a minimum cross-section yielding least displacement of the liquid to be conditioned with a maximum outer surface yielding a rapid transfer of heat to the liquid to be conditioned. Obviously the prerequisites for the supply vessel part 17 are just the opposite, i. e. it should accommodate a maximum of heat transfer medium in a vessel having a very little exposed and generally restricted surface, so that a rounding off of parts approximating a spherical form may be desirable. Therefore the cross-section of the supply vessel is preferably larger than that of the heat transfer vessel, although the contours of the cross-sections should not be similarly related but the length of the contour of the cross-section of the heat transfer part may be equal to or even exceed the length of the contour of the cross-section of a supply vessel, as it is for instance indicated in the embodiment of the drawing.

Having thus described my invention in detail, yet I do not wish to be limited thereby, except as the state of the art and the appended claim may require, for it is obvious that various modifications and changes may be made in the form of embodiment of my invention, without departing from the spirit and scope thereof.

What I claim is:

An implement for conditioning a liquid by immersion, comprising a bottomwise closed heat transfer vessel having reentering side walls forming fins, and means insulating said walls where the fins merge with each other.

HANS TRETTER.